Dec. 30, 1947. T. B. THURMAN 2,433,583
SHUTTER
Filed June 20, 1945 2 Sheets-Sheet 1
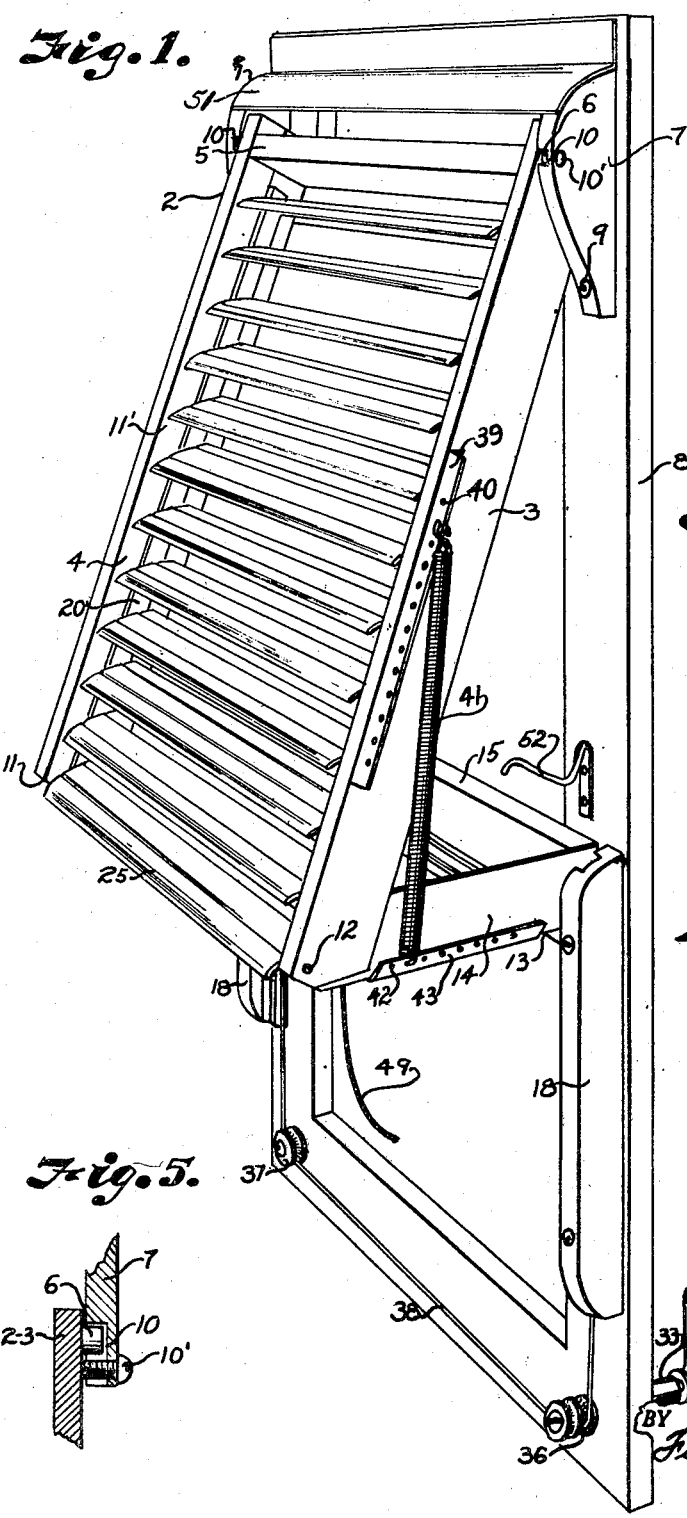
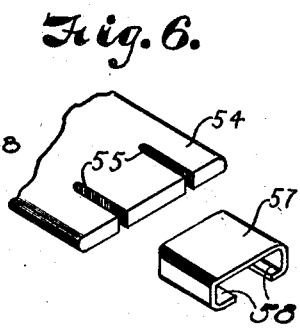
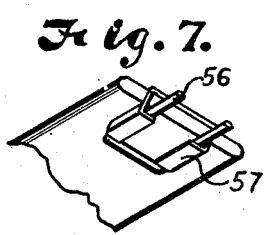
INVENTOR.
Tandy Burr Thurman
BY Fishburn & Mullendore
ATTORNEYS

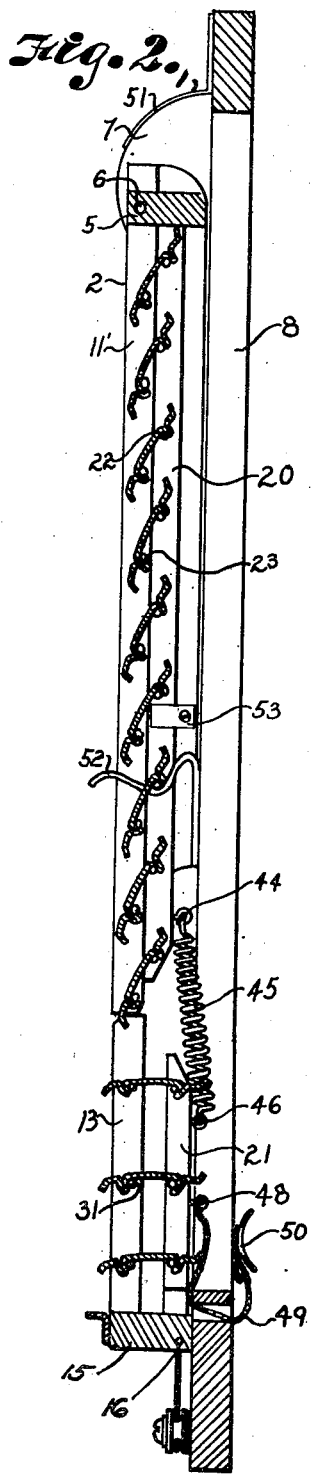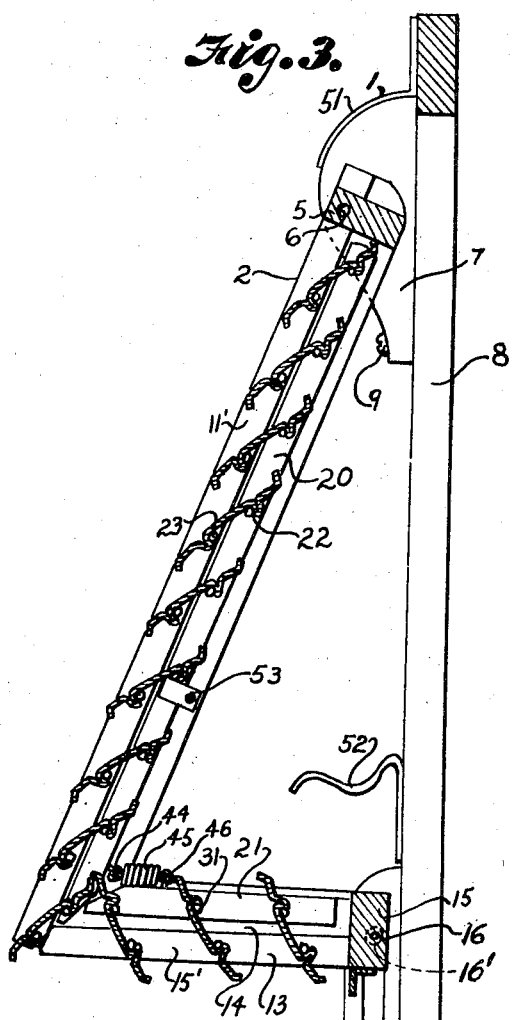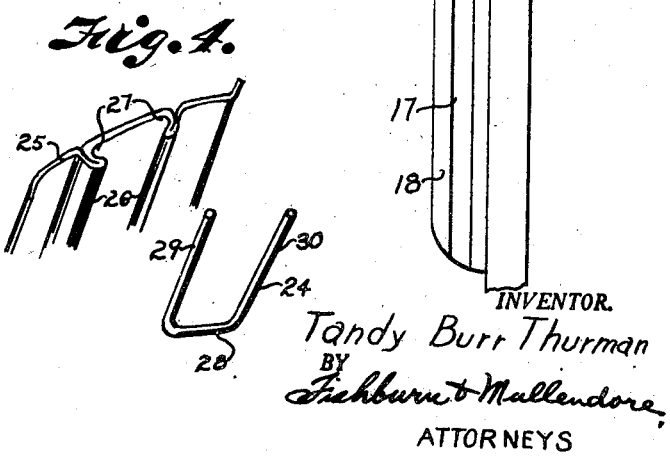

Patented Dec. 30, 1947

2,433,583

UNITED STATES PATENT OFFICE 2,433,583

SHUTTER

Tandy Burr Thurman, Kansas City, Mo.

Application June 20, 1945, Serial No. 600,525

11 Claims. (Cl. 160—193)

This invention relates to shutters particularly for use in windows and like openings, and has for its principal object to provide a simple, inexpensive structure that is readily attachable to the outside of the casing or frame of such window or like openings.

Other objects of the invention are to provide a shutter having a framework of two sections pivotally connected at their abutting ends so that the lower section may be raised to a horizontal position and the upper section at an angular position; to provide louvers for the respective sections having pivotal connection with the side frames of said sections so that raising or lowering of the awnings will simultaneously shift position of the louvers to adjust the same to admit light through the shutter and prevent sun and rain from entering the window opening; to provide means operable from the inside of a window in which the shutter is situated for raising and lowering the shutter and thereby adjusting the louvers to the desired position; to provide means on the side frames of the sections for anchoring the louvers to permit automatic adjustment of the louvers; to provide a louver adapted to receive trunnions for mounting the louvers in the respective sections so that the louvers may be adjusted to desired position and to add strength to the louvers; and to provide an attachment of the trunnions to the louvers so that the louvers may be quickly and easily anchored in the frames.

In accomplishing these and other objects of the invention, I have provided improved structure, the preferred form of which is illustrated in the accompanying drawings, wherein:

Fig. 1 is a perspective view of a shutter constructed in accordance with the present invention and mounted on a window casing and particularly showing the shutter in raised position.

Fig. 2 is a vertical cross-section of the shutter shown in lowered position and particularly illustrating the mounting of the louvers.

Fig. 3 is a view similar to Fig. 2 but showing the shutter in raised position.

Fig. 4 is an enlarged view of an end of a louver and its trunnion particularly illustrating the mounting of the trunnion in the louver.

Fig. 5 is a cross-section illustrating the pivoting of the upper section to the window casing.

Fig. 6 is a perspective view of the end of a modified form of louver showing the clip for mounting the trunnion to disassembled relation.

Fig. 7 is a perspective view showing the trunnion in assembled relation.

Referring more in detail to the drawings:

I designates a shutter constructed in accordance with the present invention and which comprises a substantially rectangular section 2 including side frames 3 and 4 and an end rail 5 at the upper end of the section adapted to be pivotally secured by pins or the like 6 to brackets 7, which are rigidly fastened to a window casing 8 by screws or the like 9. The brackets are provided with slots 10 for insertion of the pins 6 and are held in place by screws 10'. While I have here illustrated my invention as secured to the outside of a casing for a window or like opening, it will be obvious that the shutter may be applied to a frame for insertion in the window opening, to a screen frame or the like, or by other suitable means. I have here illustrated and described my invention as composed of metal, such as steel, aluminum or the like, but it will likewise be obvious any suitable material may be used. The outer edges of the side frames are turned inwardly and backwardly forming a channel 11 having side flanges 11' for anchoring the louvers, as later described.

Pivotally connected to the lower end of the section 2 by pins or the like 12 is a section 13 having side frames 14 and a bottom end rail 15. The side frames 13 are also turned and channeled as are the side frames of the upper section forming side flanges 15' and are of a width to fit in the channel 11 of the side frames 3 and 4 of the upper section 2. The end rail 15 is provided with outwardly extending pins 16 provided with sleeved rollers 16' loosely engaging in openings (not shown) adapted to fit in the groove 17 of a bracket member 18 attached to the lower end of the window casing 8 so that when it is desired to raise and lower the shutter, the rollers 16' will roll up and down in the groove 17 in said bracket member.

Adapted for slidable movement on the inside of the side frames 3 and 4 of the sections 2 and 13 spaced from and parallel to the side flanges 11' and 15' and bars or the like 20 and 21 respectively. The bars 20 and 21 are provided with spaced openings 22 and the side flanges 11 of the upper section and 15' of the lower section are provided with spaced openings 23 corresponding to and arranged with respect to the openings 22 in the bars for mounting trunnions 24 in louvers 25 whereby the louvers are pivotally supported in the respective sections 2 and 13 of the shutter. The bars or cleats 20 and 21 are preferably made of wood and may be of any suitable shape, but are here preferably shown to be of strip form and slidable with respect to the side frames of the sections.

The louvers 25 are preferably constructed from sheet metal, such as tin, aluminum or the like, and may be assembled of relatively short sections to provide louvers of sufficient length to close the opening between the side frames of the sections. In order to provide a simple connection for the louvers and trunnions, the louvers are preferably provided with flanges 26 on the underneath side of the louvers having their outer edges turned slightly inward towards each other to form recesses 27 for receiving the trunnions 24. The flanges 26 may be formed by crimping of the sheet metal or in any suitable manner. The outer edge of the louver may be turned downwardly and the inner edge is turned upwardly so that the respective louvers may overlap if desired, or they may be flat if desired. Crimping or otherwise forming of the flanges 26 will add strength to the louvers so that they will withstand strains and stresses due to wind or other causes and prevent their becoming bent or deformed.

The trunnion members 24 are formed of spring wire-like material bent to provide a connecting bar portion 28 having outwardly flared shanks 29 and 30. The bar portion 28 is inserted in the recess portions 27 formed by the flanges 26 and the trunnions being formed of spring wire-like material, their shank portions being flared slightly outwardly, will have a certain resiliency or spring thereto which will tend to hold the trunnions in the louvers and prevent rattling of the louvers. One of the shanks 29 and 30 is adapted to engage in the openings 23 in the side flanges 11' of the side frames 3 and 4 as well as in openings 31 in the flanges 15' of the side frames 14 of the section 13, and the other shank will engage in the openings 22 in the side bars 20 and 21, such shank of the trunnions providing support for the bars or cleats 20 and 21 in the side frames of the sections. It will be noted that when the sections are thus formed together with the trunnions engaged in the louvers and with one shank engaging with the opening in the frame and the other shank in the bars or cleats, the cleats will be held in position within the frame sections and slidable with respect thereto to shift position of the louvers, as hereafter described.

From the foregoing it will be noted when the shutter is desired to be opened, the inner end of the lower section 13 will be raised and the lower end of the upper section 2 will be extended outwardly, as illustrated in Figs. 1 and 3, to give the shutter and awning effect. In order to raise the awning, I provide means extending through the casing to the inside of the window or like opening comprising a shaft 33 extending through the casing 8, a crank arm 34 having a handle 35. The outer end of the shank 33 is provided with a spool 36 fastened to the end of the shank 33 in any suitable manner. The opposite corner of the frame is provided with a roller or pulley 37. A wire line, cord, or the like 38 having its respective ends fastened to the upper face of the cross rail 15 near its respective ends by suitable means, such as eye screws (not shown), is provided for raising and lowering the shutter, the cord engaging over the pulley 37 and adapted to be wound on the spool 36 by turning of the crank.

The side frame 3 is provided with a stamped-out portion 39 having a plurality of openings 40 adapted to receive one end of a coil spring 41 having its opposite ends engaging in bore openings 42 of a stamped-out portion 43 of the side frame 14 of the lower section 13. This spring may be adjusted in the bore openings 40 and 42 in order to exert tension on the lower section to assist in raising such section when the crank is being turned to elevate the same.

An eye bolt 44 is secured to the lower end of the bar 20 adapted to receive one end of a coil spring 45 having its opposite end engaging in an eye bolt 46 on the bar 21 (Fig. 3), for a purpose later described.

The lower louver of the upper section is fastened to the side frames and to the lower end of the bars 20 by screws or the like (not shown) and the trunnions 24 of the bottom louver are rigidly secured to the recesses in the flange of the louver by welding or other suitable means. The screws are provided between the ends of the louver and the side frames and bars with a washer (not shown) to act as a bushing between the louver and the side frames.

Secured to the lower end of one of the bars 21 is an eye bolt 48 (Fig. 2) having one end of a cord 49 fastened thereto. The cord extends through an opening in the casing and the opposite end is engaged with a hook or the like 50 to manually shift the louvers on the lower section as later described.

The bracket 7 at the top of the window casing for supporting the upper section of the shutter is provided with a cover or plate 51 of a contour to prevent rain and sun from entering the window opening above the louvers of section 2.

In assembling a shutter constructed as described, the trunnion members 24 are inserted with the bar portion 28 thereof engaging within the recess 27 of the louvers and the shanks 29 and 30 inserted in the openings 22 and 23 respectively of the bars 20 and 21 and the side frames 3 and 4 of the upper section and 14 of the lower section so that the louvers and bars will be supported within the frame sections 2 and 13. The trunnions are inserted in the recess a sufficient distance so that the shanks will pass the flange and bar, then the trunnions are pressed outwardly until the shanks enter the openings. In this manner the louvers may be anchored successively one at a time.

The frame sections 2 and 13 are assembled by inserting the top rail member 5 between the side frames and are attached thereto by screws, nailing or other suitable manner. The pins 6 are then inserted in the grooves 10 of the brackets 7 to anchor the top of the shutter to said brackets. The lower section 13 may then be fastened to the lower end of the upper section by bolts, screws, or the like 12 which engage in the recesses of the ends of the bottom louver 25 of the upper section, thus preventing spread of the side frames 3 and 4 and pivotally connecting the upper and lower sections. The lower end rail 15 is attached to the lower section by nailing or other suitable means and the pins 16 with their rollers 16' inserted in the groove 17 in the bracket 18 at the lower end of the window casing.

When the shutter is in closed position as shown in Fig. 2, all of the louvers of the upper section are slanted forwardly downwardly, the louvers of the upper section being closed by engagement of the guide arm 52 attached to the casing with the shank of one of the trunnions which is engaged in one of the openings 22 in the bar 20. The guide is sloped downwardly so that when the side frame is closed tightly thereagainst, it will raise the bar to close the louvers. The louvers of the lower section will be in substantially horizontal position. If it is desired to change the position of the louvers of the lower section, pull on the cord 49 will tension the springs 45 and will raise the bar 21, thus changing position of the lower louvers to the desired position, or by fastening the cord at different lengths, the louvers may be slanted at any position to allow for air or light to enter the window opening as desired.

When the shutter is desired to be raised, turning of the crank in the opposite direction will raise the lower end of the lower section by engagement of the rollers 16' on the pin 16 which are adapted to roll in the groove 17 in the bracket member 18 and as the shanks of one of the trunnions above referred to disengages from the guide arm 52, the upper louvers will change to substantially horizontal position. Continued raising of the lower section will extend the lower end of the upper section outwardly and the lower section being raised to horizontal position which will cause the end of the bar 21 to contact the end of the bar 20, thus exerting upward pressure on the bars 20 to shift position of the louvers in the upper section.

In order to prevent the bars 20 of the upper section dropping to an extent that the shank of the trunnion will not engage the guide arm 52, a stop 53 is rigidly secured to the side frame so that a trunnion of the bars 20 will be engaged thereon to limit downward movement of the bars.

Figs. 6 and 7 illustrate a modified form of louver adapted for use in my invention which comprises a louver 54 preferably made of wood having slots 55 in each end thereof adapted to receive a trunnion 56. 57 designates a clip or the like adapted to engage in the slots 55 in the ends of the louver, said clip having flanges forming channels 58 for receiving the trunnions for mounting them on the louvers, as best illustrated in Fig. 7. It will be obvious that with this form of invention, the trunnion will be movable inwardly and outwardly in the clip to adjust the same in the side bars, as set out in the preferred form of the invention.

From the foregoing it is obvious that I have provided a shutter of simple, inexpensive construction and which is well adapted for its intended purpose.

What I claim and desire to secure by Letters Patent is:

1. A shutter for attachment to a casing of a window opening, comprising upper and lower sections pivotally connected together and having side frames, bars slidable along the inside of said side frames, louvers in said sections, trunnions pivotally connecting the louvers to said side frames and said bars, means attaching said sections to the casing, means including a pivot shaft of a crank arm extending through the casing for raising and lowering said shutter, and means on said sections for adjusting the louvers upon raising and lowering of the sections.

2. A shutter for attachment to a casing of a window opening, comprising upper and lower sections pivotally connected together and having side frames, bars slidable along the inside of said side frames, louvers in said sections, means pivotally connecting the louvers to said side frames and said bars, means attaching said sections to the casing, and means including a pivot shaft of a crank arm extending through the casing for raising and lowering said shutter.

3. A shutter for attachment to a casing of a window opening, comprising upper and lower sections pivotally connected together and having side frames, bars slidable along the inside of said side frames, louvers in said sections, trunnions connected to the louvers having one shank connected to the side frames and another shank connected to said bars, means attaching said sections to the casing, means including a pivot shaft of a crank arm extending through the casing for raising and lowering said shutter, and means on said sections for adjusting the louvers upon raising and lowering of the sections.

4. A shutter for attachment to a casing of a window opening, comprising upper and lower sections pivotally connected together and having side frames, bars slidable along the inside of said side frames, louvers in said sections, trunnions for engaging the louvers having one shank pivotally connected to the side frames and another shank pivotally connected to said bars, means attaching said sections to the casing, means including a pivot shaft of a crank arm extending through the casing for raising and lowering said shutter, and means on said sections for adjusting the louvers upon raising and lowering of the sections.

5. A shutter for attachment to a casing of a window opening, comprising upper and lower sections pivotally connected together and having side frames, bars slidable along the inside of said side frames, louvers in said sections, trunnions for engaging the louvers having one shank pivotally connected to the side frames and another shank pivotally connected to said bars, means pivotally attaching said sections to the casing, means including a pivot shaft of a crank arm extending through the casing for raising and lowering said shutter, and means on said sections for adjusting the louvers upon raising and lowering of the sections.

6. A shutter for attachment to a casing of a window opening, comprising upper and lower sections pivotally connected together and having side frames, bars slidable along the inside of said side frames, louvers in said sections, trunnions for engaging the louvers having one shank pivotally connected to the side frames and another shank pivotally connected to said bars, means pivotally attaching said sections to the casing, means including a pivot shaft of a crank arm extending through the casing for raising and lowering said shutter, and spring means on said sections for adjusting the louvers upon raising and lowering of the sections.

7. A ventilator for attachment to a casing of a window opening comprising upper and lower frame sections pivotally connected together, bars slidable along the inside of said frame sections, louvers in said sections, trunnions carried by said louvers for pivotally connecting said louvers to said frame sections and to said bars, means pivotally and slidably connecting the lower end of said lower section to said casing, means including a pivot shaft of a crank arm extending through said casing for raising and lowering said lower section, and means carried by said sections for adjusting said louvers.

8. A ventilator for attachment to a casing of a window opening comprising upper and lower frame sections pivotally connected together, bars slidable along the inside of said frame sections, louvers in said sections, trunnions carried by said louvers for pivotally connecting said louvers to said frame sections and to said bars, means pivotally and slidably connecting the lower end of said lower section to said casing, means including a pivot shaft of a crank arm extending through said casing for raising and lowering said lower section, and means carried by said sections for automatically adjusting said louvers.

9. A ventilator for attachment to a window opening comprising upper and lower frame sections pivotally connected together, bars slidable along the inside of said frame sections, louvers in said sections, trunnions carried by said louvers for pivotally connecting said louvers to said frame sections and to said bars, means pivotally and slidably connecting the lower end of said lower section to said window opening, means on the inside of said window opening for raising and lowering said lower section, and means carried by said sections for automatically adjusting said louvers.

10. A ventilator for attachment to a window opening comprising upper and lower frame sections pivotally connected together, said upper section being pivotally connected to the top of the window opening, bars slidable along the inside of said frame sections, louvers in said sections, trunnions carried by said louvers for pivotally connecting said louvers to said frame sections and to said bars, means pivotally and slidably connecting the lower end of said lower section to said window opening, and means on the inside of said window opening for raising and lowering said lower section.

11. A ventilator for attachment to a window opening comprising upper and lower frame sections pivotally connected together, said upper section being pivotally connected to the top of the window opening, bars slidable along the inside of said frame sections, louvers in said sections, trunnions carried by said louvers for pivotally connecting said louvers to said frame sections and to said bars, means pivotally and slidably connecting the lower end of said lower section to said window opening, means on the inside of said window opening for raising and lowering said lower section, and hook and spring means for automatically adjusting said louvers.

TANDY BURR THURMAN.

REFERENCES CITED

The following references are of record in the file of this patent:

UNITED STATES PATENTS

| Number | Name | Date |
|--------|------|------|
| 534,523 | Schmitt | Feb. 19, 1895 |